United States Patent
Vick, Jr.

(10) Patent No.: US 10,174,589 B2
(45) Date of Patent: Jan. 8, 2019

(54) MAGNETIC SPRING BOOSTER FOR SUBSURFACE SAFETY VALVE

(71) Applicant: Halliburton Energy Services, Inc., Houston, TX (US)

(72) Inventor: James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 381 days.

(21) Appl. No.: 14/395,782

(22) PCT Filed: Dec. 16, 2013

(86) PCT No.: PCT/US2013/075453
§ 371 (c)(1),
(2) Date: Oct. 20, 2014

(87) PCT Pub. No.: WO2015/094168
PCT Pub. Date: Jun. 25, 2015

(65) Prior Publication Data
US 2016/0265309 A1 Sep. 15, 2016

(51) Int. Cl.
*E21B 34/10* (2006.01)
*F16K 31/122* (2006.01)
*E21B 34/00* (2006.01)

(52) U.S. Cl.
CPC .......... *E21B 34/10* (2013.01); *F16K 31/1221* (2013.01); *E21B 2034/005* (2013.01)

(58) Field of Classification Search
CPC .......... E21B 34/10; E21B 34/14; E21B 34/06; E21B 2034/005; F16K 31/08; F16K 31/1221
See application file for complete search history.

(56) References Cited

U.S. PATENT DOCUMENTS

| 4,986,357 A | 1/1991 | Pringle |
| 2003/0155131 A1 | 8/2003 | Vick |
| 2007/0289734 A1 | 12/2007 | McDonald et al. |
| 2008/0053662 A1 | 3/2008 | Williamson et al. |
| 2008/0157014 A1 | 7/2008 | Vick, Jr. et al. |
| 2011/0120728 A1* | 5/2011 | Lake ............... E21B 34/066 166/375 |
| 2012/0032099 A1 | 2/2012 | Vick, Jr. |
| 2012/0125597 A1 | 5/2012 | Vick, Jr. et al. |

FOREIGN PATENT DOCUMENTS

WO 2015094168 A1 6/2015

OTHER PUBLICATIONS

International Search Report and Written Opinion for PCT/US2013/075453 dated Sep. 24, 2014.

* cited by examiner

*Primary Examiner* — Giovanna C. Wright
*Assistant Examiner* — Manuel C Portocarrero
(74) *Attorney, Agent, or Firm* — McGuireWoods LLP

(57) ABSTRACT

Disclosed is a subsurface safety valve with a magnetic booster feature. One disclosed safety valve includes a housing, a flow tube reciprocably disposed between an upper position and a lower position within the housing, a first magnetic element coupled to the housing, and a second magnetic element coupled to the flow tube and configured such that interaction of the first and second magnetic elements induces at least one of a first force on the flow tube when the flow tube is in the upper position and a second force on the flow tube when the flow tube is in the lower position.

20 Claims, 4 Drawing Sheets

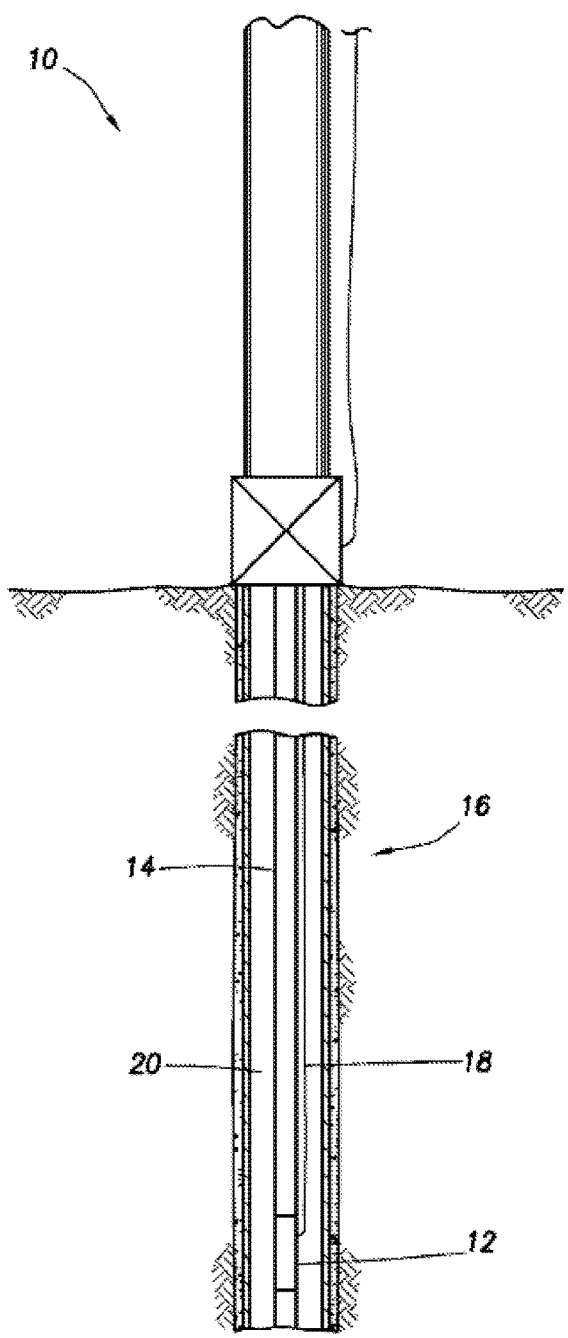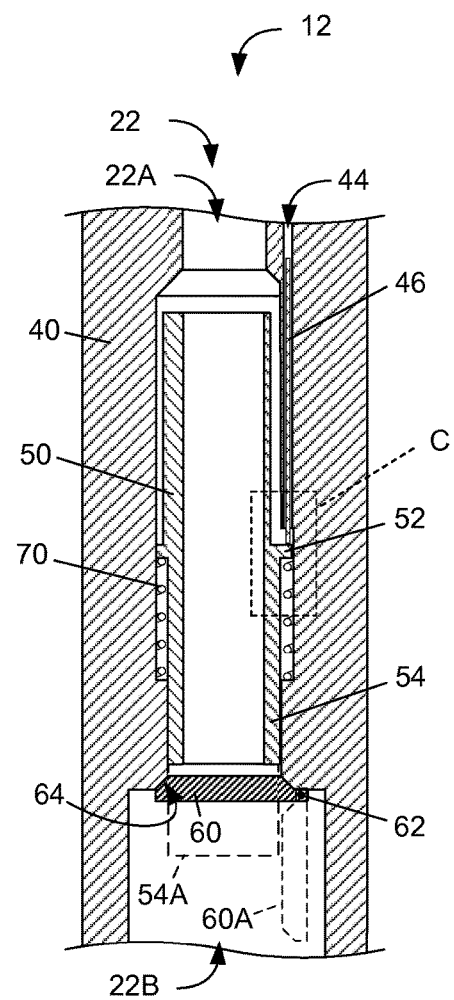
FIG. 1A
FIG. 1B

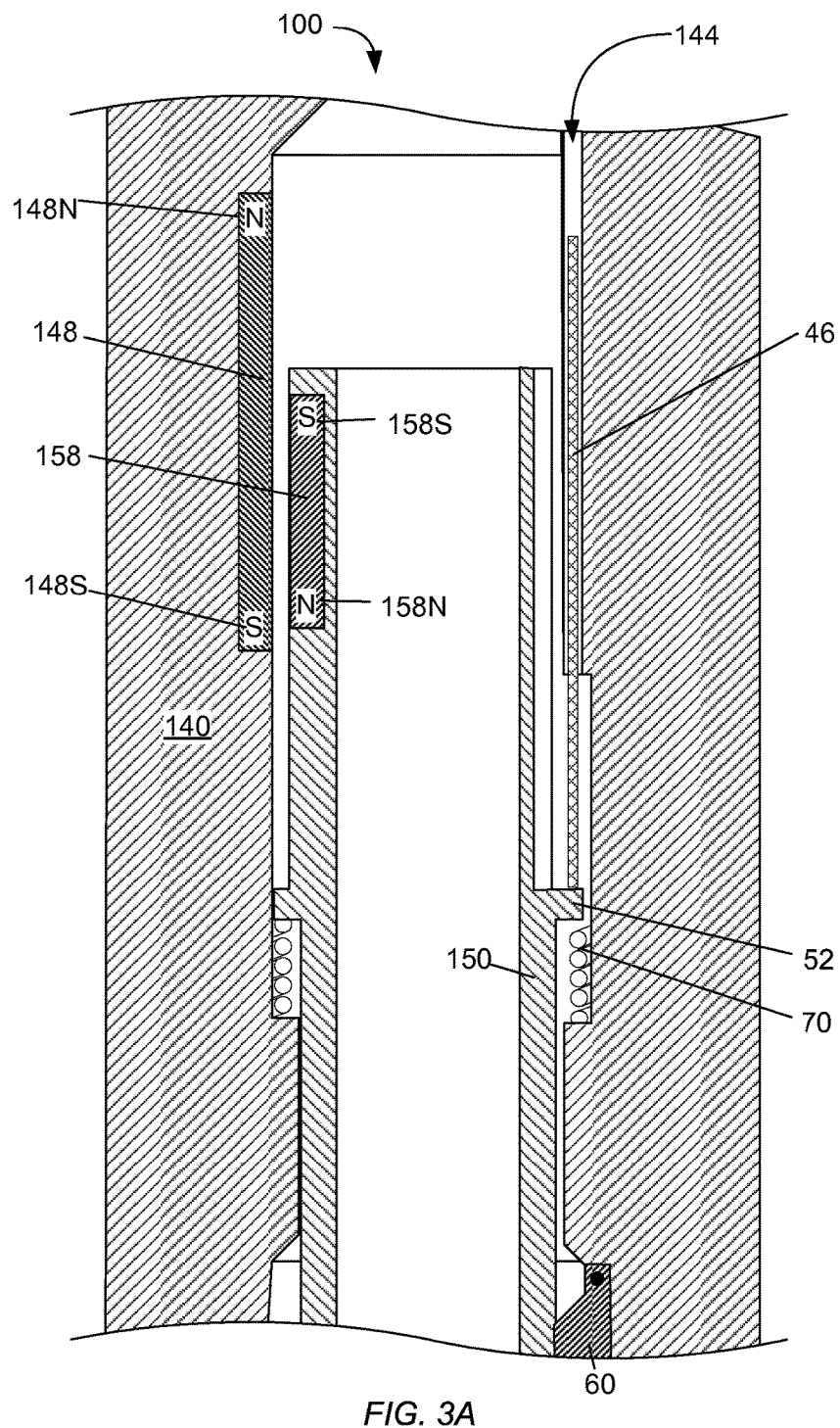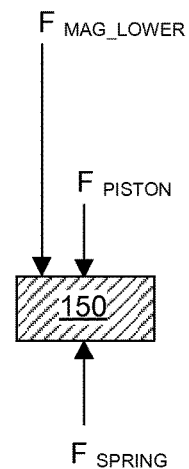
FIG. 3A
FIG. 3B

MAGNETIC SPRING BOOSTER FOR SUBSURFACE SAFETY VALVE

The application is a National Stage entry of and claims priority to International Application No. PCT/US2013/075453, filed on Dec. 16, 2013.

BACKGROUND

The present disclosure relates generally to operations performed and equipment utilized in conjunction with a subterranean well and, in particular, to a subsurface safety valve with a magnetic booster feature.

Subsurface safety valves are well known in the oil and gas industry and act as a failsafe to prevent the uncontrolled release of reservoir fluids in the event of a worst-case scenario surface disaster. Typical subsurface safety valves are flapper-type valves, which are opened and closed with the help of a flow tube moving telescopically within the production tubular. The flow tube is often controlled hydraulically from the surface and is forced into its open position using a piston and rod assembly that may be hydraulically charged via a control line linked directly to a hydraulic manifold or control panel at the well surface. When sufficient hydraulic pressure is conveyed to the subsurface safety valve via the control line, the piston and rod assembly forces the flow tube downwards, which compresses a spring and simultaneously pushes the flapper downwards to the open position. When the hydraulic pressure is removed from the control line, the spring pushes the flow tube back up, which allows the flapper to move into its closed position.

Some safety valves are arranged thousands of feet underground wherein the hydrostatic pressure can be thousands of pounds per square inch (psi). This may require the hydraulic pressure in the control line to exceed 10,000 psi, thus requiring expensive special high-pressure pumps and equipment.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

FIG. 1A is a representative partial cross-sectional view of a well system which can embody principles of this disclosure.

FIG. 1B is an enlarged schematic cross-sectional view of the conventional safety valve in FIG. 1A.

FIG. 3A is a simplified schematic cross-sectional view of the safety valve of FIG. 2A in an open position, according to one or more embodiments.

FIG. 3B is a free-body diagram of the forces applied to the flow tube in the lower position, according to one or more embodiments.

DETAILED DESCRIPTION

Figures 1C, 1D:
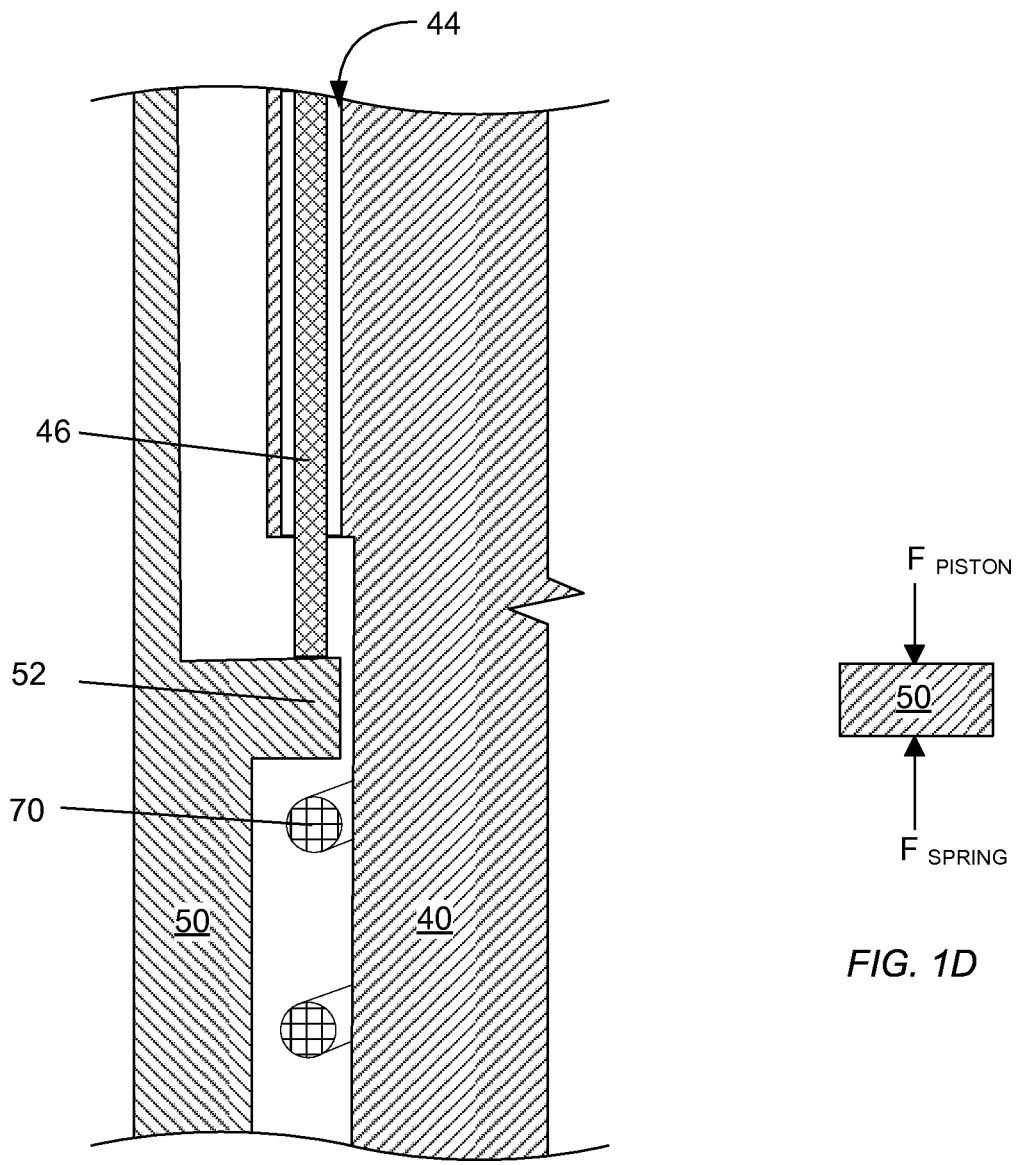
FIG. 1C is an enlarged schematic cross-sectional view of the portion of the safety valve enclosed by the box labeled "C" in FIG. 1B.
FIG. 1D is a free-body diagram of the forces applied to a conventional flow tube.

The present disclosure relates generally to operations performed and equipment utilized in conjunction with a subterranean well and, in particular, to a subsurface safety valve with a magnetic booster feature.

The disclosed embodiments are directed to a safety valve having magnetic elements that interact to assist in the opening and closing of a flapper valve using pressurized hydraulic fluid provided from equipment located on the surface. In certain embodiments, one or more magnetic elements are fixedly coupled to the housing of the safety valve while a corresponding quantity of magnetic elements is fixedly coupled to the movable flow tube. The interaction of the magnetic elements of the flow tube with the magnetic elements of the housing may apply one or more of an upward force on the flow tube when the safety valve is in a closed position and a downward force on the flow tube when the safety valve is in an open position.

As used herein, the phrase "flow tube" means an element that is extended to open a flapper or maintain a flapper in the open position. Elements with this function are sometimes referred to as an "opening prong" or a "control sleeve." An alternate embodiment of a safety valve may utilize a different type of element to hold the flapper open, without departing from the scope of the disclosure.

As used herein, a reference identifier may be used as a general label, for example "101," for a type of element and alternately used to indicate a specific instance or characterization, for example "101A" and "101B," of that same type of element.

FIG. 1A is a representative partial cross-sectional view of a well system 10 which can embody principles of this disclosure, according to one or more embodiments. The well system 10 may include a safety valve 12 that is interconnected in a tubular string 14 as part of a production assembly 16 positioned in a wellbore 20. A hydraulic line 18 may be used to control operation of the safety valve 12 from a remote location, such as the earth's surface, a subsea facility, etc.

The safety valve 12 is used to selectively permit and prevent flow of fluids through a flow passage 22 (not visible in FIG. 1, see FIG. 2) of the tubular string 14 which extends through the safety valve. Specifically, in emergency situations the safety valve 12 may be used to close off the passage 22 and thereby prevent uncontrolled flow of hydrocarbons to the surface via the tubular string 14.

It should be clearly understood, however, that the well system 10 as depicted in FIG. 1 and described herein is only one of the many applications for the principles of this disclosure. A large variety of different well systems and other applications may incorporate the principles of this disclosure. Accordingly, it will be appreciated that this disclosure is not limited in any respect to the details of the depicted well system 10.

FIG. 1B is an enlarged schematic cross-sectional view of the safety valve 12 of FIG. 1A. In this embodiment, a flapper valve 60 is able to rotate about a pivot 62 relative to a valve seat 64. A flow tube 50 is reciprocably disposed within a housing 40 and a flow passage 22 extends through the housing 40 and the flow tube 50. The flow passage 22 is separated into an upper portion 22A and a lower portion 22B within the safety valve 12 on either axial end of the flow tube 50. A piston rod 46 is disposed within a bore 44 defined in the housing 40, and the hydraulic line 18 of FIG. 1A (not visible in FIG. 1B) is fluidly coupled to an upper end of the bore 44. While not shown, a piston may be arranged at the upper end of the piston rod 46 and configured to interact with hydraulic fluid introduced into the bore 44 via the hydraulic line 18. A lower end of the piston rod 46 bears against a flange 52 or other feature of the flow tube 50. When a pressurized fluid is provided through the hydraulic line 18 to the bore 44, a force is applied to the upper end of piston rod 46 by the pressurized fluid, thereby creating a downward force on the flange 52.

In operation, hydraulic fluid may be provided through the hydraulic line 18 from a hydraulic manifold (not shown) arranged at a remote location, such as at a production platform or a subsea control station. When properly applied, the force applied to the flange 52 by the piston rod 46 causes the flow tube 50 to advance downward within the flow passage 22 so as to open and maintain the flapper valve 60 in its open position, thereby allowing production fluids to flow through the tubular string 14. When the flow tube 50 is displaced downward such that the lower end 54 of the flow tube 50 reaches the position 54A (shown in dashed lines), the lower end 54 will contact the flapper valve 60 and rotate the flapper valve 60 downward about the pivot 62 to the position 60A (shown in dashed lines), thereby permitting flow through the flow passage 22.

To close the safety valve 12, e.g., move the flapper valve 60 from its open position 60A to the closed position shown in FIG. 1B, the hydraulic pressure in the hydraulic line 18 applied to the bore 44 may be reduced or otherwise eliminated. This allows the spring 70 to force the flow tube 50 upward thus allowing a flapper spring (not shown) to move the flapper valve 60 back to its closed position.

FIG. 1C is an enlarged schematic cross-sectional view of the portion of the safety valve 12 enclosed by the box labeled "C" in FIG. 1B. The lower end of the piston rod 46 is in contact with the flange 52 of the flow tube 50. Fluid pressure applied within the bore 44 will correspondingly apply pressure to the upper end of the piston rod 46 (e.g., a piston arranged at the upper end), thereby creating a downward force on the piston rod 46 that is transferred from the piston rod 46 to the flange 52. The spring 70 is also in contact with an underside of the flange 52 (contact point is not visible in FIG. 1C), thereby applying an upward force to the flange 52.

FIG. 1D is a free-body diagram of the forces applied to the conventional flow tube 50. The depicted central block represents the entire flow tube 50, since the flange 52 is fixedly attached to the flow tube 50 and any force applied to the flange 52 is effectively applied to the entire flow tube 50. A positive downward force $F_{PISTON}$ is applied by the piston rod 46 to the flow tube 50. The force $F_{PISTON}$ is the sum of a downward force created by pressure within the bore 44 at the top of the piston rod 46 and an upward force created by pressure within the well passage 22 at the bottom of the piston rod 46. A positive upward force $F_{SPRING}$ is applied by the spring 70.

To facilitate a better understanding of the present disclosure, the following example is given with continued reference to FIGS. 1A-1D. In no way should this example be read to limit, or to define, the scope of the disclosure. In this example, the safety valve 12 of FIG. 1B is to be set at a depth of 10,000 feet and is rated to operate at pressures up to 7500 psi, i.e., the valve 12 must operate at a depth where the local well pressure ($P_{WELL}$) in passage 22 is in the range of 0-7500 psi. Hydraulic pressure is applied at the surface to the hydraulic fluid within hydraulic line 18 and therethrough to the bore 44. The hydraulic fluid has a density of approximately 0.47 pounds per cubic inch (lb/in$^3$).

The selected spring 70 exerts a force of about 500 pounds (lbs.) ($F_{CLOSE}$) when the flow tube 50 is in the upper position. When the flow tube 50 is in the lower position, the spring 70 is compressed and therefore exerts a force of about 800 lbs. ($F_{OPEN}$). It is desired that the flapper valve 60 will close (i.e., the flow tube 50 will move from the lower position to the upper position) when the hydraulic pressure applied at the surface is at or below 500 psi ($P_{CLOSE}$).

At a density of 0.47 lb./in$^3$, the 10,000 foot column of hydraulic fluid within the hydraulic line 18 from the surface down to the safety valve 12 creates a pressure at the top of the piston of:

$$P_{STATIC\_HEAD}=10,000*0.47=4700 \text{ psi}$$

The force ($F_{PISTON}$) applied by the piston rod 46 is the vector sum of the downward pressure applied to the top of the piston rod 46 by the hydraulic pressure in the bore 44, which is the sum of the static head ($P_{STATIC\_HEAD}$) and the pressure applied at the surface ($P_{CLOSE}$), and the upward pressure applied to the bottom of the piston rod 46 by the local well pressure ($P_{WELL}$) in passage 22, with the net pressure multiplied by the cross-section area of the piston rod 46 ($A_{PISTON}$). This is shown as follows:

$$F_{PISTON}=(P_{CLOSE}+P_{STATIC\_HEAD}-P_{WELL})*A_{PISTON}$$

The force ($F_{SPRING}$) applied by the spring 70 has a different value depending on the amount of compression of the spring 70 as determined by the position of the flow tube 50. In this example and subsequent calculations, $F_{SPRING}$ is replaced with either $F_{CLOSE}$ or $F_{OPEN}$, depending on the configuration being analyzed.

To ensure that the flapper valve 60 remains closed when the surface hydraulic pressure is less than or equal to 500 psi and the well pressure is zero (worst case for the flapper valve 60 remaining closed), the force applied by the piston rod 46 must be less than or equal to the force applied by the spring 70. The force applied by the piston for a determined pressure is determined by the cross-sectional area $A_{PISTON}$ of the piston rod 46. This is calculated and shown as follows:

$$F_{PISTON}=(P_{CLOSE}+P_{STATIC\_HEAD}-P_{WELL})*A_{PISTON}=F_{CLOSE}$$

$$A_{PISTON} \leq F_{CLOSE}/(P_{CLOSE}+P_{STATIC\_HEAD}-P_{WELL})= 500/(4700+500-0)$$

$$A_{PISTON} \leq 0.096 \text{ in}^t$$

Thus, the bore 44 must have a diameter that corresponds to the following:

$$D_{PISTON}=SQRT(A_{PISTON}/Pi)*2=SQRT(0.096/3.14)*2$$

$$D_{PISTON}=0.350 \text{ inch}$$

To drive the flow tube 50 to the lower position, and thereby open the flapper valve 60 with the piston rod 46, the minimum hydraulic pressure provided at the surface ($P_{OPEN}$) must create enough force to overcome the sum of the force applied by the spring 70 ($F_{OPEN}$) when the flow tube 50 is in the lower position and the force created by the rated maximum well pressure (worst case for opening the flapper valve 60). The opening pressure is given by the following:

$$F_{PISTON}=(P_{OPEN}+P_{STATIC\_HEAD}-P_{WELL})* A_{PISTON} \geq F_{OPEN}$$

$$P_{OPEN} \geq (F_{OPEN}/A_{PISTON}) - P_{STATIC\_HEAD} + P_{WELL}$$

$$P_{OPEN} \geq (800/0.096) - 4700 + 7500$$

$$P_{OPEN} \geq 11{,}133 \text{ psi}$$

The cost of hydraulic pumping equipment scales with the maximum pressure capability. Equipment tends to come in one of three pressure ranges. Equipment rated up to 5000 psi is considered "standard." Equipment rated up to 10,000 psi is considered "high-pressure" and may cost more than standard-pressure equipment. Equipment having a pressure rating above 10,000 psi, however, is considered "special" and requires special and often custom design, testing, and safety certification, raising the cost of special equipment by a considerable amount compared to either standard or high-pressure equipment. It is not uncommon for "special" equipment to cost 5-10 times as much as a similar piece of "high-pressure" equipment. For this reason, it is highly desirable to keep the maximum operating pressures at least below 10,000 psi.

One approach to reducing the pressure required at the surface to actuate a safety valve is to reduce the difference between the amount of force ($F_{PISTON}$) required to open the safety valve and the amount of force that allows the safety valve to close. According to the present disclosure, a set of magnetic elements may be employed to apply forces in different directions when the flow tube is in different positions. Accordingly, the exemplary magnetic elements described herein may reduce the difference between $F_{PISTON}$ required to open the safety valve and the amount of force that allows the safety valve to close.

Figures 2A, 2B:
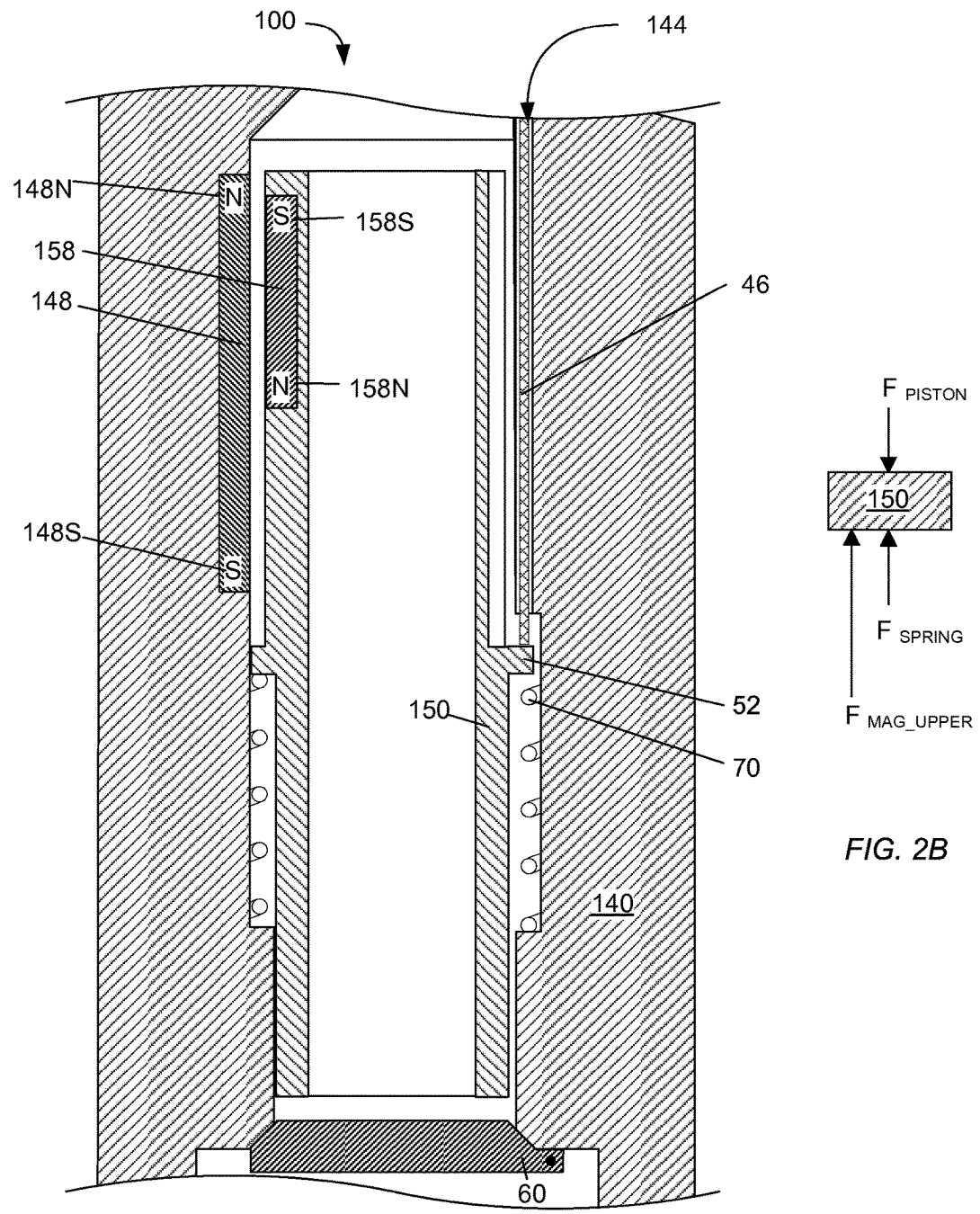
FIG. 2A is a simplified schematic cross-sectional view of an exemplary safety valve in a closed position, according to one or more embodiments.
FIG. 2B is a free-body diagram of the forces applied to the flow tube in the upper position, according to one or more embodiments.

FIG. 2A is a simplified schematic cross-sectional view of an exemplary safety valve 100 in a closed position, according to one or more embodiments of the disclosure. Elements that are the same as safety valve 12 of FIGS. 1A-1D retain the same reference number, therefore the description of these elements is not repeated.

The safety valve 100 may include a pair of magnetic elements 148, 158 respectively attached to the housing 140 and the flow tube 150. The magnetic elements 148, 158 have respective magnetic north poles 148N, 158N and respective magnetic south poles 148S, 158S, arranged as shown in FIG. 2A. The embodiment of FIG. 2A shows these magnetic elements 148, 158 as single bar magnets embedded in the walls of the housing 140 and the flow tube 150, and it should be recognized that this is only a schematic representation of possible embodiments. In certain embodiments, one or both of the magnetic elements 148, 158 may be disposed within corresponding cavities defined in the respective housing 140 and flow tube 150. In certain embodiments, one or both of the magnetic elements 148, 158 may be fixedly attached to the respective housing 140 and flow tube 150, for example within recesses (not shown in FIG. 2A) formed in the walls of the respective housing 140 and flow tube 150. In certain embodiments, multiple sets of magnetic elements 148, 158 may be disposed about the circumference of the housing 140 and flow tube 150.

In certain embodiments, one or both of the magnetic elements 148, 158 may be formed from multiple magnetic sub-elements (not shown in FIG. 2A) arranged in a continuous row. In certain embodiments, one or both of the magnetic elements 148, 158 may be formed from two magnetic sub-elements positioned such that, for example, a north magnetic pole of one of the sub-elements is disposed at the position of north magnetic pole 148N and a south magnetic pole of the other sub-element is disposed at the position of south magnetic pole 148S. In certain embodiments, one or both of the magnetic elements 148, 158 may be provided as permanent magnets or electromagnets. Other arrangements and embodiments of elements 148, 158 that generate a magnetic field will be apparent to those of skill in the art.

In this example embodiment, and with the flow tube 150 in the upper position that corresponds to a closed position of the safety valve 100, the south magnetic pole 158S of the magnetic element 158 is proximate to the north magnetic pole 148N of the magnetic element 148. This proximity enables the north magnetic pole 148N to attract the south magnetic pole 158S, thereby applying an upward force on the flow tube 150. In certain embodiments, the polarity of the north magnetic pole 148N and the south magnetic pole 158S shown in FIG. 2A may be reversed without departing from the scope of this disclosure.

FIG. 2B is a free-body diagram of the forces applied to the flow tube 150 in the upper position, according to one or more embodiments. In addition to the forces applied by the spring 70 ($F_{SPRING}$) and the piston rod 46 ($F_{PISTON}$), there is an upward force ($F_{MAG\_UPPER}$) applied by the magnetic element 148 to the magnetic element 158 when the flow tube 150 is in the upper position. To facilitate a better understanding of this embodiment, the following example is given with continued reference to FIGS. 2A and 2B. Again, in no way should this example be read to limit, or to define, the scope of the disclosure.

In this example, the exemplary safety valve 100 is to be used at the same depth of 10,000 feet and at the same pressure rating of 7500 psi as considered for the conventional safety valve 12 in the example provided above. The same spring 70 is also used. Magnetic elements 148, 158 have been chosen to apply an upward force ($F_{MAG\_UPPER}$) of 150 lbs. to the flow tube 150 when the flow tube 150 is in the upper position and a downward force ($F_{MAG\_LOWER}$) of 150 lbs. to the flow tube 150 when the flow tube 150 is in the lower position. It is again desired that the flapper valve 60 remains closed when the surface hydraulic pressure is less than or equal to 500 psi and the well pressure is zero (worst case for the flapper valve 60 remaining closed). The maximum cross-sectional area $A_{PISTON}$ of the piston rod 46 is given by the following:

$$F_{PISTON} = (P_{CLOSE} + P_{STATIC\_HEAD} - P_{WELL}) * A_{PISTON} \leq F_{MAG}\_UPPER + F_{CLOSE}$$

$$A_{PISTON} \leq (F_{MAG}\_UPPER + F_{CLOSE})/(P_{CLOSE} + P_{STATIC\_HEAD} - P_{WELL})$$

$$A_{PISTON} \leq (500+150)/(4700+500-0)$$

$$A_{PISTON} \leq 0.125 \text{ in}^2$$

Thus, the bore 44 of the magnetically-assisted safety valve 100 must have a diameter that is determined by the following:

$$D_{PISTON} = \text{SQRT}(A_{PISTON}/Pi)*2 = \text{SQRT}(0.125/3.14)*2$$

$$D_{PISTON} = 0.400 \text{ inch}$$

Accordingly, the magnetically assisted safety valve 100 can use a larger piston rod 46, which may be more resistant to buckling in compression and therefore more reliable, in conjunction with a larger bore 44, which may be easier to drill in the housing 140.

Discussion of the preceding example is now continued with reference to FIGS. 3A and 3B. In particular, FIG. 3A is a simplified schematic cross-sectional view of the safety valve 100 of FIG. 2A in an open position, according to one or more embodiments. In this example embodiment, and with the flow tube 150 in the lower position corresponding to an open position of the safety valve 100, the north magnetic pole 158N of the magnetic element 158 is proximate to the south magnetic pole 148S of the magnetic element 148. This proximity enables the south magnetic pole 148S to attract the north magnetic pole 158N, thereby applying a downward force on the flow tube 150.

FIG. 3B is a free-body diagram of the forces applied to the flow tube 150 when the flow tube 150 is in the lower position, according to one or more embodiments. In addition to the forces applied by the spring 70 ($F_{SPRING}$) and piston rod 46 ($F_{PISTON}$), there is a downward force ($F_{MAG\_LOWER}$) applied by the magnetic element 148 to the magnetic element 158 when the flow tube 150 is in the lower position.

As described above, the magnetic elements 148, 158 apply a downward force ($F_{MAG\_LOWER}$) of 150 lbs. to the flow tube 150 when in the lower position. The minimum hydraulic pressure provided at the surface ($P_{OPEN}$) must create enough force to balance the force applied by the spring 70 ($F_{OPEN}$) when the flow tube 150 is in the lower position and the well pressure is at the rated maximum (worst case for opening the flapper valve 60). The opening pressure for the magnetically-assisted safety valve 100 is therefore given as follows:

$$F_{PISTON} = (P_{OPEN} + P_{STATIC\_HEAD} - P_{WELL}) * A_{PISTON} \geq F_{OPEN} - F_{MAG\_LOWER}$$

$$P_{OPEN} \geq ((F_{OPEN} - F_{MAG\_LOWER})/A_{PISTON}) - P_{STATIC\_HEAD} + P_{WELL}$$

$$P_{OPEN} \geq ((800-150)/0.125) - 4700 + 7500$$

$$P_{OPEN} \leq 8000 \text{ psi}$$

Thus, the magnetically-assisted safety valve 100 operates at a maximum surface pressure of 8000 psi, compared to the 11,133 psi required with the safety valve 12 discussed above. This reduction in the maximum required pressure eliminates the need for "special" pumping equipment, as the required pressure is now less than 10,000 psi, and may significantly reduce the cost of the pressure equipment needed to operate the well.

It should be noted that the design selection of the magnetic elements 148, 158 to apply an upward force of 150 lbs. to the flow tube 150 when the flow tube 150 is in the upper position and a downward force of 150 lbs. to the flow tube 150 when the flow tube 150 is in the lower position implies that there is at least one intermediate position of the flow tube 150 when the force applied by the magnetic elements 148, 158 to the flow tube 150 is zero. Accordingly, care should be exercised by the designer to verify that the hydraulic pressure required at this position of the spring 70 is less than the pressure required when the spring 70 is fully compressed with the magnetic elements 148, 158 providing the selected amount of downward force.

In certain circumstances, it is necessary to constrain the design of the spring 70 to fit within a safety valve 12, 100. To facilitate a better understanding of such circumstances, the following example is given with continued reference to the preceding figures and safety valves 12 and 100. Again, in no way should this example be read to limit, or to define, the scope of the disclosure. In this example, the spring 70 may be made from a smaller-diameter wire and exhibits a shorter free-length than the spring 70 of the preceding examples. As a result, the spring 70 may exhibit a closing force ($F_{CLOSE}$) of 250 lbs. when the flow tube 50, 150 is in the upper position and an opening force ($F_{OPEN}$) of 650 lbs. when the flow tube 50, 150 is in the lower position. For the safety valve 12 of FIGS. 1A-1D:

$$A_{PISTON} \leq F_{CLOSE}/(P_{CLOSE} + P_{STATIC\_HEAD} - P_{WELL}) = 250/(4700+500-0)$$

$$A_{PISTON} \leq 0.048 \text{ in}^2$$

$$D_{PISTON} = \text{SQRT}(A_{PISTON}/Pi)*2 = \text{SQRT}(0.048/3.14)*2$$

$$D_{PISTON} = 0.247 \text{ inch}$$

and the opening pressure for this diameter of piston is provided by the following:

$$P_{OPEN} \geq (F_{OPEN}/A_{PISTON}) - P_{STATIC\_HEAD} + P_{WELL}$$

$$P_{OPEN} \geq (650/0.048) - 4700 + 7500$$

$$P_{OPEN} \geq 16,342 \text{ psi}$$

Not only is it challenging, if not impossible, to drill a quarter-inch diameter bore 44 through the housing 40, the surface equipment to provide hydraulic fluid at a pressure in excess of 16,000 psi may be exorbitantly expensive.

In contrast, the magnetically assisted safety valve 100 of FIGS. 2A-B and 3A-B using this same spring ($F_{CLOSE}$=250 lbs., $F_{OPEN}$=650 lbs.) does not impose these challenges and costs. For this example, the magnetic elements 148, 158 are chosen to provide an upward force ($F_{MAG\_UPPER}$) of 350 lbs. when the flow tube 150 is in the upper position and a downward force ($F_{MAG\_LOWER}$) of zero when the flow tube is in the lower position. The maximum piston size for the magnetically-assisted safety valve 100 can be determined as follows:

$$A_{PISTON} \leq (F_{MAG\_UPPER} + F_{CLOSE})/(P_{CLOSE} + P_{STATIC\_HEAD} - P_{WELL})$$

$$A_{PISTON} \leq (350+250)/(4700+500-0)$$

$$A_{PISTON} \leq 0.115 \text{ in}^2$$

$$D_{PISTON} = \text{SQRT}(A_{PISTON}/Pi)*2 = \text{SQRT}(0.115/3.14)*2$$

$$D_{PISTON} = 0.383 \text{ inch}$$

and the opening pressure for this diameter of piston is provided by the following:

$$P_{OPEN} \geq ((F_{OPEN} - F_{MAG\_LOWER})/A_{PISTON}) - P_{STATIC\_HEAD} + P_{WELL}$$

$$P_{OPEN} \geq ((650-0)/0.115) - 4700 + 7500$$

$$P_{OPEN} \geq 8452 \text{ psi}$$

Thus, while the substitution of the thinner, shorter spring 70 reduces the required diameter of the piston rod 46 in the safety valve 12 from 0.350 inch to 0.250 inch (a reduction of 29%) and increased the maximum pressure of the surface equipment from 11,133 to 16,342 psi (an increase of 47%), selection of different magnetic elements 148, 158 allows the magnetically-assisted safety valve 100 to accommodate the same thinner, shorter spring 70 with a piston diameter of 0.38 inch (a reduction of 5%) and a maximum pressure of the surface equipment of 8452 psi (an increase of 6%) that remains below 10,000 psi. In general, a bore 44 having a 0.25-inch diameter is considered infeasible due to piston rod buckling, while a 0.38 diameter is commonly done.

The preceding example thus demonstrates how the addition of the magnetic elements 148, 158 in the safety valve 100 provides an additional design element to allow the optimization of the selected spring design and piston design while maintaining the required surface hydraulic pressures below levels that require expensive special equipment. As indicated in the preceding example, the amount of force provided by the magnetic elements 148, 158 may be zero in certain positions of the flow tube 150 in certain embodiments of the safety valve 100.

In some embodiments, the transition of magnetic interaction between the opposing poles of the magnetic elements 148, 158 may be a linear transition or substantially linear. This may be accomplished, in at least one embodiment, by using magnetic elements 148, 158 consisting of multiple poles that exhibit varying intensities along the longitudinal length of the magnetic elements 148, 158. In such embodiments, the magnetic intensity of the magnetic elements 148, 158 may gradually decrease proportional to an increase in spring force by the spring 70 as the flow tube 150 is progressively moved downwards within the housing 140. As a result, a combination of the magnetic intensity of the magnetic elements 148, 158 and the spring force of the spring 70 may result in a substantially linear total force that allows substantially linear transition between the extreme ends of the magnetic elements 148, 158.

Embodiments Disclosed Herein Include:

A. A safety valve for use in a subterranean well that includes a housing, a flow tube reciprocably disposed between an upper position and a lower position within the housing, a first magnetic element coupled to the housing, and a second magnetic element coupled to the flow tube and configured such that interaction of the first and second magnetic elements induces at least one of a first force on the flow tube when the flow tube is in the upper position and a second force on the flow tube when the flow tube is in the lower position.

B. A method that may include moving a flapper valve that is disposed within a housing of a safety valve away from a closed position and toward an open position by moving a flow tube disposed within the housing away from an upper position toward a lower position, the housing comprising a first magnetic element and the flow tube comprising a second magnetic element, and interacting the first and second magnetic elements to induce at least one of a first force on the flow tube when the flow tube is in the upper position and a second force on the flow tube when the flow tube is in the lower position.

Each of embodiments A and B may have one or more of the following additional elements in any combination: Element 1: wherein the first force is an upward force and the second force is a downward force. Element 2: wherein the first magnetic element comprises a first north magnetic pole and a first south magnetic pole, the second magnetic element comprises a second north magnetic pole and a second south magnetic pole, and one of the first north magnetic pole and the second north magnetic pole are respectively proximate to the second south magnetic pole and the first south magnetic pole when the flow tube is in the upper position. Element 3: wherein the other of the first north magnetic pole and the second north magnetic pole are respectively proximate to the second south magnetic pole and the first south magnetic pole when the flow tube is in the lower position. Element 4: wherein the first magnetic element comprises a first north magnetic pole and a first south magnetic pole, the second magnetic element comprises a second north magnetic pole and a second south magnetic pole, and one of the first north magnetic pole and the second north magnetic pole are respectively proximate to the second south magnetic pole and the first south magnetic pole when the flow tube is in the lower position. Element 5: wherein the first magnetic element comprises a first upper end and a first pole disposed proximate to the first upper end, the second magnetic element comprises a second upper end and a second pole disposed proximate to the second upper end, and the first pole is one of a north magnetic pole and a south magnetic pole and the second pole is the other of the north magnetic pole and the south magnetic pole. Element 6: wherein the first magnetic element is fixedly attached to the housing and the second magnetic element is fixedly attached to the flow tube. Element 7: further comprising a spring disposed between the housing and the flow tube so as to apply an upward force to the flow tube. Element 8: wherein the spring applies a first upward force when the flow tube is in the upper position and applies a second upward force when the flow tube is in the lower position, the second force being greater than the first force. Element 9: wherein the first and second magnetic elements are at least one of permanent magnets and electromagnets. Element 10: wherein the first and second magnetic elements each comprise multiple poles arranged along a longitudinal length thereof, the multiple poles exhibiting varying intensities along the longitudinal length and thereby resulting in a linear transition between the first force and the second force.

Element 11: wherein the first force is an upward force and the second force is a downward force. Element 12: wherein the first magnetic element comprises a first north magnetic pole and a first south magnetic pole, the second magnetic element comprises a second north magnetic pole and a second south magnetic pole, and one of the first north magnetic pole and the second north magnetic pole are respectively proximate to the second south magnetic pole and the first south magnetic pole when the flow tube is in the upper position. Element 13: wherein the other of the first north magnetic pole and the second north magnetic pole are respectively proximate to the second south magnetic pole and the first south magnetic pole when the flow tube is in the lower position. Element 14: wherein the first magnetic element comprises a first north magnetic pole and a first south magnetic pole, the second magnetic element comprises a second north magnetic pole and a second south magnetic pole, and one of the first north magnetic pole and the second north magnetic pole are respectively proximate to the second south magnetic pole and the first south magnetic pole when the flow tube is in the lower position. Element 15: wherein the first magnetic element comprises a first upper end and a first pole disposed proximate to the first upper end, the second magnetic element comprises a second upper end and a second pole disposed proximate to the second upper end, and the first pole is one of a north magnetic pole and a south magnetic pole and the second pole is the other of the north magnetic pole and the south magnetic pole. Element 16: wherein the first magnetic element is fixedly attached to the housing. Element 17: wherein the second magnetic element is fixedly attached to the flow tube. Element 18: wherein the first and second magnetic elements are at least one of permanent magnets and electromagnets.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively described herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A safety valve for use in a subterranean well, the safety valve comprising:
   a housing;
   a flow tube reciprocably disposed between an upper position and a lower position within the housing;
   a first magnetic element coupled to the housing; and
   a second magnetic element coupled to the flow tube and reciprocable with the flow tube relative to a fixed position of the first magnetic element and configured to interact with the first magnetic element to induce reciprocation of the second magnetic element and the flow tube between the upper position and the lower position through application of a first magnetic force on the flow tube directed upwards when the flow tube is in the upper position and during application of a first spring force directed upwards on the flow tube, and through application of a second magnetic force on the flow tube directed downwards when the flow tube is in the lower position and during application of a piston force directed downwards on the flow tube.

2. The safety valve of claim 1, wherein:
   the first magnetic element comprises a first north magnetic pole and a first south magnetic pole;
   the second magnetic element comprises a second north magnetic pole and a second south magnetic pole; and
   one of the first north magnetic pole and the second north magnetic pole are respectively proximate to the second south magnetic pole and the first south magnetic pole when the flow tube is in the upper position.

3. The safety valve of claim 2, wherein the other of the first north magnetic pole and the second north magnetic pole are respectively proximate to the second south magnetic pole and the first south magnetic pole when the flow tube is in the lower position.

4. The safety valve of claim 1, wherein:
   the first magnetic element comprises a first north magnetic pole and a first south magnetic pole;
   the second magnetic element comprises a second north magnetic pole and a second south magnetic pole; and
   one of the first north magnetic pole and the second north magnetic pole are respectively proximate to the second south magnetic pole and the first south magnetic pole when the flow tube is in the lower position.

5. The safety valve of claim 1, wherein:
   the first magnetic element comprises a first upper end and a first pole disposed proximate to the first upper end;
   the second magnetic element comprises a second upper end and a second pole disposed proximate to the second upper end; and
   the first pole is one of a north magnetic pole and a south magnetic pole and the second pole is the other of the north magnetic pole and the south magnetic pole.

6. The safety valve of claim 1, wherein the first magnetic element is fixedly attached to the housing and the second magnetic element is fixedly attached to the flow tube.

7. The safety valve of claim 1, further comprising a spring disposed between the housing and the flow tube so as to apply the first spring force to the flow tube.

8. The safety valve of claim 7, wherein the spring is configured to apply the first spring force when the flow tube is in the upper position and applies a second spring force directed upwards on the flow tube when the flow tube is in the lower position, the second spring force being greater than the first spring force.

9. The safety valve of claim 1, wherein the first and second magnetic elements are at least one of permanent magnets and electromagnets.

10. The safety valve of claim 1, wherein the first and second magnetic elements each comprise multiple poles arranged along a longitudinal length thereof, the multiple poles exhibiting varying intensities along the longitudinal length and thereby resulting in a linear transition between the first magnetic force and the second magnetic force.

11. The safety valve of claim 1, wherein both of the first and second magnetic elements are permanent magnets.

12. A method, comprising:
   moving a flapper valve that is disposed within a housing of a safety valve away from a closed position and toward an open position by moving a flow tube disposed within the housing away from an upper position toward a lower position through application of a piston force directed downwards on the flow tube, the housing comprising a first magnetic element disposed at a fixed position therein and the flow tube comprising a second magnetic element;
   moving the flapper valve away from the open position and toward the closed position by moving the flow tube disposed within the housing away from the lower position toward the upper position through application of a spring force directed upwards on the flow tube; and
   interacting the first magnetic element with the second magnetic element to induce reciprocation of the second magnetic element and the flow tube between the upper position and the lower position through application of a first magnetic force on the flow tube directed upwards when the flow tube is in the upper position and during the application of the spring force, and through application of a second magnetic force on the flow tube directed downwards when the flow tube is in the lower position and during the application of the piston force.

13. The method of claim 12, wherein:
   the first magnetic element comprises a first north magnetic pole and a first south magnetic pole;

the second magnetic element comprises a second north magnetic pole and a second south magnetic pole; and one of the first north magnetic pole and the second north magnetic pole are respectively proximate to the second south magnetic pole and the first south magnetic pole when the flow tube is in the upper position.

14. The method of claim 13, wherein the other of the first north magnetic pole and the second north magnetic pole are respectively proximate to the second south magnetic pole and the first south magnetic pole when the flow tube is in the lower position.

15. The method of claim 12, wherein:

the first magnetic element comprises a first north magnetic pole and a first south magnetic pole;

the second magnetic element comprises a second north magnetic pole and a second south magnetic pole; and one of the first north magnetic pole and the second north magnetic pole are respectively proximate to the second south magnetic pole and the first south magnetic pole when the flow tube is in the lower position.

16. The method of claim 12, wherein:

the first magnetic element comprises a first upper end and a first pole disposed proximate to the first upper end;

the second magnetic element comprises a second upper end and a second pole disposed proximate to the second upper end; and the first pole is one of a north magnetic pole and a south magnetic pole and the second pole is the other of the north magnetic pole and the south magnetic pole.

17. The method of claim 12, wherein the first magnetic element is fixedly attached to the housing.

18. The method of claim 12, wherein the second magnetic element is fixedly attached to the flow tube.

19. The method of claim 12, wherein the first and second magnetic elements are at least one of permanent magnets and electromagnets.

20. The method of claim 12, wherein both of the first and second magnetic elements are permanent magnets.

* * * * *